US008525459B2

(12) United States Patent
Setbacken et al.

(10) Patent No.: US 8,525,459 B2
(45) Date of Patent: Sep. 3, 2013

(54) CODE DISK, OPTICAL ENCODER, AND MOTOR SYSTEM

(75) Inventors: Robert M. Setbacken, Santa Barbara, CA (US); Ruth E. Franklin, Santa Barbara, CA (US)

(73) Assignee: Heidenhain Corporation, Schaumburg, IL (US)

( * ) Notice: Subject to any disclaimer, the term of this patent is extended or adjusted under 35 U.S.C. 154(b) by 308 days.

(21) Appl. No.: 12/837,071

(22) Filed: Jul. 15, 2010

(65) Prior Publication Data

US 2012/0013279 A1    Jan. 19, 2012

(51) Int. Cl.
*H02K 29/10* (2006.01)

(52) U.S. Cl.
USPC ...... 318/400.4; 318/266; 318/640; 250/237 G

(58) Field of Classification Search
USPC ............... 318/400.04, 400.37, 254, 567, 651, 318/662, 266, 400.4, 640; 250/231.13, 231.14, 250/237 G, 231.18; 324/207.22
See application file for complete search history.

(56) References Cited

U.S. PATENT DOCUMENTS

| 3,265,802 | A | * | 8/1966 | Hillman et al. | ............... 174/16.3 |
| 3,303,347 | A | * | 2/1967 | Wingate | ................... 250/231.18 |
| 3,312,828 | A | * | 4/1967 | Wingate | ............................ 341/9 |
| 3,983,391 | A | * | 9/1976 | Clemons | ................... 250/237 G |
| 4,338,553 | A | * | 7/1982 | Scott, Jr. | ........................ 318/266 |
| 4,628,298 | A | * | 12/1986 | Hafle et al. | ......................... 341/1 |
| 4,685,007 | A | * | 8/1987 | Nazarian et al. | ........... 360/78.14 |
| 4,751,441 | A | * | 6/1988 | Lewis | ....................... 318/400.09 |
| 4,831,315 | A | * | 5/1989 | Hammond et al. | ........... 318/567 |
| 4,979,055 | A | * | 12/1990 | Squires et al. | ................... 360/69 |
| 5,103,225 | A | * | 4/1992 | Dolan et al. | ..................... 341/13 |
| 5,936,236 | A | * | 8/1999 | Setbacken et al. | ........ 250/231.13 |
| 5,998,783 | A | * | 12/1999 | Stridsberg | ................ 250/231.13 |
| 6,084,234 | A | * | 7/2000 | Stridsberg | ................ 250/231.16 |
| 6,172,359 | B1 | * | 1/2001 | Stridsberg | ................ 250/231.13 |
| 6,175,109 | B1 | * | 1/2001 | Setbacken et al. | ........ 250/231.13 |
| 6,191,415 | B1 | * | 2/2001 | Stridsberg | ................ 250/231.13 |
| 6,279,108 | B1 | * | 8/2001 | Squires et al. | ................ 712/244 |
| 6,630,659 | B1 | * | 10/2003 | Stridsberg | ................ 250/231.13 |
| 6,683,427 | B2 | * | 1/2004 | Desbiolles et al. | ........ 318/400.4 |
| 6,686,713 | B2 | * | 2/2004 | Desbiolles et al. | ...... 318/400.37 |
| 6,741,048 | B2 | * | 5/2004 | Desbiolles et al. | ...... 318/400.37 |

(Continued)

FOREIGN PATENT DOCUMENTS

JP    58-223018    12/1983

OTHER PUBLICATIONS

"Phase Fluorometry Using a Continuously Modulated Laser Diode" by Richard B. Thompson, Joan K. Frisoli, and Joseph R. Lakowicz, Anal. Chem Sep. 18, 1992, vol. 64, 2075-2078.*

(Continued)

*Primary Examiner* — Paul Ip
(74) *Attorney, Agent, or Firm* — Kenyon & Kenyon LLP

(57) ABSTRACT

An optical encoder includes a light source, a light sensor array, and a code disk having a data track and a commutation pattern. The commutation pattern includes first, second, and third commutation tracks, each including a series of apertures configured to allow light to continuously pass from the light source to a respective light sensor of the light sensor array as the series of apertures passes over the first light sensor. The relative positions of the first, second, and third commutation tracks correspond to a commutation sequence of a brushless motor.

20 Claims, 7 Drawing Sheets

(56) References Cited

U.S. PATENT DOCUMENTS

| | | | |
|---|---|---|---|
| 6,963,063 B2 * | 11/2005 | Johnson | 250/231.13 |
| 7,022,975 B2 * | 4/2006 | Horton | 250/231.14 |
| 7,253,612 B2 * | 8/2007 | Schroter et al. | 324/207.22 |
| 2003/0057902 A1 * | 3/2003 | Desbiolles et al. | 318/254 |
| 2003/0057903 A1 * | 3/2003 | Desbiolles et al. | 318/254 |
| 2003/0059212 A1 * | 3/2003 | Desbiolles et al. | 388/804 |
| 2004/0066187 A1 * | 4/2004 | Schroter et al. | 324/207.22 |
| 2004/0232319 A1 * | 11/2004 | Johnson | 250/231.13 |
| 2005/0023451 A1 * | 2/2005 | Horton | 250/231.14 |
| 2011/0187355 A1 * | 8/2011 | Dixon et al. | 324/207.25 |

OTHER PUBLICATIONS

Encoder Products Company—Why Do You Need EPC's Opto-ASIC Technology? by Encoder Products Company Jan. 2006.*

Optical Shaft Encoder Kit by Innovation First Inc. at www.VexRobotics.com Aug. 2007.*

* cited by examiner

CODE DISK, OPTICAL ENCODER, AND MOTOR SYSTEM

FIELD OF THE INVENTION

The present invention relates to a code disk for an optical encoder, an optical encoder including the code disk, and a motor system including the optical encoder.

BACKGROUND INFORMATION

Encoders are used to measure angular or linear displacement. Optical encoders include light sensor arrays, e.g., photodiode arrays, arranged in a detection plane for detecting incremental signals indicative of relative movement, e.g., rotary or linear movement, of encoder parts. Optical encoders include a light source, a scale index member (such as, e.g., a slotted or graduated code disk), and an array of photodiodes. A graduated code disk includes alternating transparent and opaque areas arranged periodically in a defined, fixed code disk pitch. In rotary encoders, the code disk is typically coupled to a rotating shaft and moved relative to the light source and the light sensor array.

Light is directed from the light source to the light sensor array by the scale index member or code disk. As the code disk rotates in the case of an angular encoder, or moves linearly in the case of a linear encoder, output signals from the light sensor array change. These varying output signals are used to measure angular or linear displacement.

Rotary encoders may be used in connection with electric motors, such as brushed and brushless motors. Brushed and brushless motors are driven differently, and a rotary encoder may play a more involved role in the driving of brushless motors.

A brushed direct-current motor applies current to a stator, which is typically fixed with respect to the motor housing, and a rotor, which rotates with respect to the stator. In this typical arrangement, the rotor acts as an electromagnet, whereas the stator has stationary permanent magnets. The force needed to drive the rotor within the stator is provided by the attraction and repulsion between the electromagnet in the spinning rotor and the permanent magnets in the stator. This arrangement typically requires changing the polarity of the electromagnet of the stator as the stator performs each full rotation. This changing of polarity is accomplished with a brush arrangement whereby two or more brushes, which are typically fixed with respect to the housing, alternatingly contact two or more electrodes of the rotor to provide electrical power to the electromagnet. The alternating contact is provided due to the fixed placement of the electrodes on the rotor. Thus, the rotation of the rotor with respect to the brushes causes each electrode to alternatingly physically contact each of the two brushes. In this manner, the polarity of the electromagnet of the rotor is alternated. The rotary switching brush mechanism is considered a mechanical commutator.

Brushless motors, which dispense with the brush arrangement, provide one or more electromagnets on the stator, while the rotor is provided with an arrangement of permanent magnets. In this arrangement, a direct current to the electromagnets of the stator is switched to actuate the rotation of the rotor. Since a brush mechanism, i.e., a mechanical commutator, is not provided, brushless motors typically utilize an electronic commutation system to control the respective polarities of the electromagnets of the stator.

To facilitate the electronic commutation, it is advantageous to determine the rotational position of rotor with respect to the stator. Based on the determined position, commutation circuitry controls the steering of current through the windings of the electromagnets of the stator.

One mechanism for determining the position of the rotor for commutation is to provide a circuit board having Hall-effect devices. This mechanism provides Hall-effect sensors on the circuit board. The circuit board is aligned with the rotor such that one or more magnets on the rotor communicate with the Hall-effect sensors during rotation of the rotor.

For applications where positional feedback is desired, e.g., in servo applications, the Hall-effect switching can add bulk to the motor system, since the Hall-effect circuit board is provided for commutation, while an encoder is provided separately for precise positional feedback. In these and other applications, it may be advantageous to utilize the encoder code disk for the commutation instead of a Hall-effect arrangement. Using an optical encoder, for example, the code disk may be provided with a plurality of commutation tracks that allow light to be blocked or passed from the light source to the photodiode array depending on the position of the rotor with respect to the stator.

Where the commutation tracks are provided as cutouts in the code disk, the mechanical integrity of the code disk may be substantially compromised due to the removal of material in the relatively thin metallic disk. This may be especially problematic where the brushless motor has a relatively small number of poles, e.g., two, which typically leads to longer commutation tracks and, hence, longer continuous cutouts of code disk material. For example, in a two-pole motor, each of three commutation track slots would need to extend approximately 180 mechanical degrees around the center of the code disk. As such, where low pole-number motors are desired, e.g., in higher speed applications, Hall-effect commutation sensors are generally used for commutation.

In addition to commutation tracks, other code disk tracks or slots may present analogous problems when they are sufficiently elongated along the code disk.

SUMMARY

According to example embodiments of the present invention, an optical encoder includes a light source, a light sensor array, and a code disk. The code disk includes a data track having a plurality of slots configured to allow light from the light source to pass to the light sensor array to determine a rotational position of the code disk. The code disk also includes a commutation pattern having a first commutation track including a series of apertures configured to allow light to continuously pass from the light source to a first light sensor of the light sensor array as the series of apertures passes over the first light sensor, a second commutation track including a series of apertures configured to allow light to continuously pass from the light source to a second light sensor of the light sensor array as the series of apertures passes over the second light sensor, and a third commutation track including a series of apertures configured to allow light to continuously pass from the light source to a third light sensor of the light sensor array as the series of apertures passes over the third light sensor. The relative positions of the first, second, and third commutation tracks correspond to a commutation sequence of a brushless motor.

The first commutation track may be disposed at a first radius from a rotation axis of the code disk, the second track may be disposed at a second radius from the rotation axis, the second radius being less than the first radius, and the third commutation track may be disposed at a third radius from the rotation axis, the third radius being less than the second radius.

The apertures of the first, second, and third tracks may be circular.

The diameter of the apertures of the first, second, and third tracks may be, e.g., between 0.1 and 0.2 mm.

The diameter of the apertures of the first, second, and third tracks may be 0.16 mm.

Adjacent apertures of the series of the first track may be spaced apart from each other by a first distance, adjacent apertures of the series of the second track may be spaced apart by a second distance, the second distance being less than the first distance, and adjacent apertures of the series of the third track may be spaced apart by a third distance, the third distance being less than the second distance.

The data track may be disposed at a fourth radius, the fourth radius being greater than the first radius.

The commutation sequence may correspond to a one pole-pair brushless motor.

The brushless motor may include a stator having, e.g., exactly three electromagnets.

The thickness of the code disk may be, e.g., between 25 microns and 40 microns.

Each series of apertures of the first, second, and third commutation tracks may extend 180 mechanical degrees around the rotation axis.

Moving clockwise around the rotation axis of the code disk, the first aperture in the series of the second commutation track may be disposed 120 mechanical degrees from the first aperture of the series of the first commutation track, and the first aperture in the series of the third commutation track may be disposed 120 mechanical degrees from the first aperture in the series of the second commutation track. Since this code disk pattern relates to a two-pole (one pole-pair) motor, the 120 mechanical degree dispositions each correspond to 120 magnetic degrees, as one full mechanical rotation of the rotor results in one full magnetic cycle of the rotor.

For, e.g., a 4-pole (2 pole-pair) motor, the first commutation track, the second commutation track, and the third commutation track may each include two series of apertures, the two series being separated by disk portions that prevent light from passing from the light source to the respective light sensor.

Each series of apertures of the first commutation track, the second commutation track, and the third commutation may extend 90 degrees around the rotation axis.

The optical encoder may be, e.g., an incremental encoder or an absolute encoder.

According to example embodiments of the present invention, a motor system includes a brushless motor and an optical encoder. The optical encoder includes a light source, a light sensor array, and a code disk having a data track and a commutation pattern. The data track includes a plurality of slots configured to allow light from the light source to pass to the light sensor array to determine a rotational position of the code disk. The commutation pattern includes a first commutation track including a series of apertures configured to allow light to continuously pass from the light source to a first light sensor of the light sensor array as the series of apertures passes over the first light sensor, a second commutation track including a series of apertures configured to allow light to continuously pass from the light source to a second light sensor of the light sensor array as the series of apertures passes over the second light sensor, and a third commutation track including a series of apertures configured to allow light to continuously pass from the light source to a third light sensor of the light sensor array as the series of apertures passes over the third light sensor. The relative positions of the first, second, and third commutation tracks correspond to a commutation sequence of the brushless motor.

The motor system may include a controller configured to supply current to electromagnetic coils in the motor stator based on the signals received from the first, second, and third light sensors.

The brushless motor may be a one pole-pair brushless motor.

According to example embodiments of the present invention, a code disk for an optical encoder includes a data track having a plurality of slots configured to allow light from a light source to pass to a light sensor array to determine a rotational position of the code disk. The code disk also includes a commutation pattern having a first commutation track including a series of apertures configured to allow light to continuously pass from the light source to a first light sensor of the light sensor array as the series of apertures pass over the first light sensor, a second commutation track including a series of apertures configured to allow light to continuously pass from the light source to a second light sensor of the light sensor array as the series of apertures passes over the second light sensor, and a third commutation track including a series of apertures configured to allow light to continuously pass from the light source to a third light sensor of the light sensor array as the series of apertures passes over the third light sensor. The relative positions of the first, second, and third commutation tracks correspond to a commutation sequence of a brushless motor.

It should be appreciated that the code disk, optical encoder, and motor system may have any one or more of the features described herein.

Further details and aspects of example embodiments of the present invention are described in more detail below with reference to the appended Figures.

DETAILED DESCRIPTION

Figure 1:
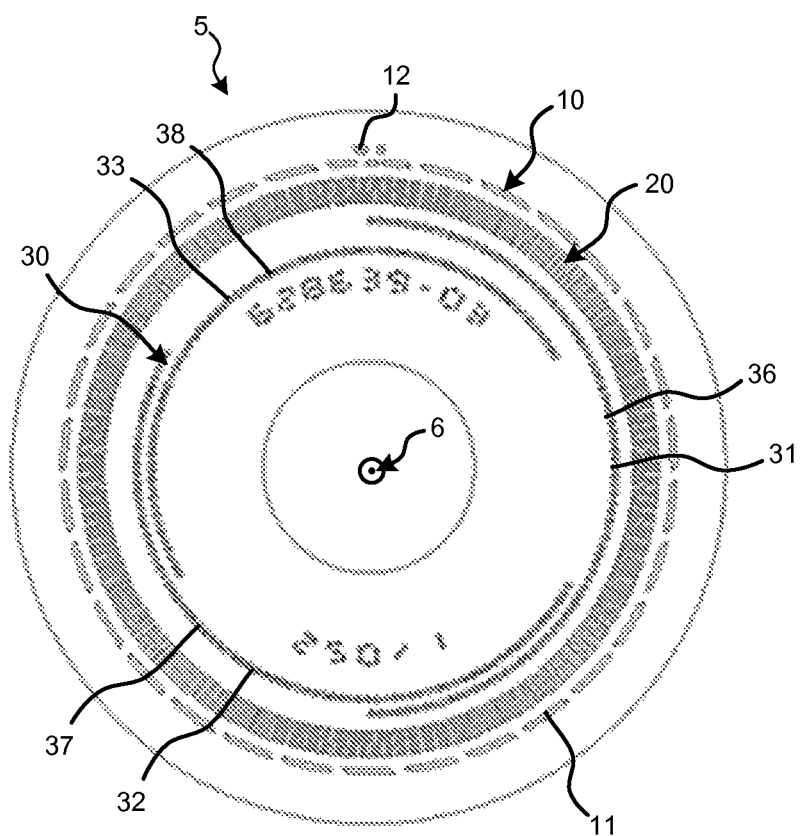
FIGS. 1 and 2 are top views of a code disk according to example embodiments of the present invention.

FIG. 1 is a top view of a code disk 5 according to example embodiments of the present invention. The code disk 5 is a thin metallic disk having a plurality of apertures therethrough, each configured to allow light to pass from a light source to a photodiode or other light sensor configured to sense the transmitted light.

The code disk 5 includes three different groups or types of apertures. The outermost group of apertures is an index track group 10, including an "off" track 11 and an "on" track 12. The off track extends nearly 360 mechanical degrees around the code disk, except for the region of the on track 12. Unless otherwise specified herein, the term "degrees" refers to mechanical degrees as opposed to magnetic degrees. When the code disk rotates about its axis 6, the sensing of light through the aperture of the on track 12 provides an indication that the code disk is at a zero or home position, thereby allowing calibration. The sensing of light through the off track 11 provides an indication that the code disk is in a position other than the zero position.

The middle grouping of apertures is a data track 20, which includes a series of slots spaced apart by a fixed and constant amount. The spacing between the adjacent slots constitutes the pitch and defines the resolution of the encoder. In this regard, the slots of the data track 20 allow light from a light source to be alternatingly blocked from and passed to a light sensor, e.g., a photodiode. By calculating the discrete number of light pulses (taking into account the zero position determined from the index track) as the disk 5 rotates in a given direction, the encoder allows calculation of the angular position of the rotating shaft to which the code disk is attached.

Figure 3:
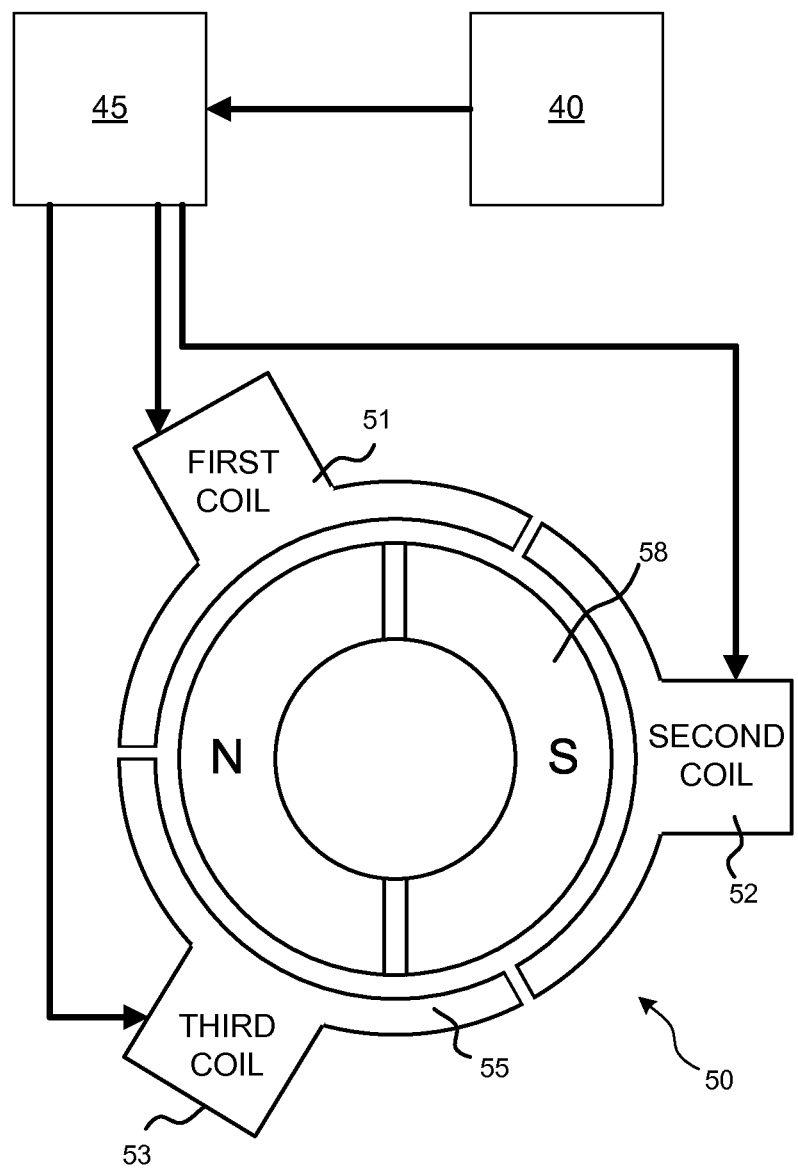
FIG. 3 is a schematic view of a brushless motor, controller and encoder used in connection with the code disk of FIGS. 1 and 2.

The inner grouping of apertures is a commutation track group 30 used to provide commutation for a brushless motor 50, schematically illustrated in FIG. 3, to which an encoder containing the code disk 5 is coupled. Since the code disk is rotationally fixed with respect to the rotor 58 of the brushless motor 50, the code disk 5 is able to provide feedback for electronic commutation of the brushless motor.

The brushless motor 50 is a two-pole motor where the rotor 58 is a magnet with a north pole N and a south pole S, and the stator 55 includes three coils 51, 52, and 53 each being part of separately controllable electromagnets.

In order to drive the rotor 58 in a given rotational direction, the coils 51, 52, and 53 should be controlled in an appropriate sequence. Accordingly, an optical encoder 40, which includes the code disk 5 (which is rotationally fixed to the rotor 58), sends a signal to a controller 45, which controls the coils 51, 52, and 53 based on the received encoder signal.

Figure 2:
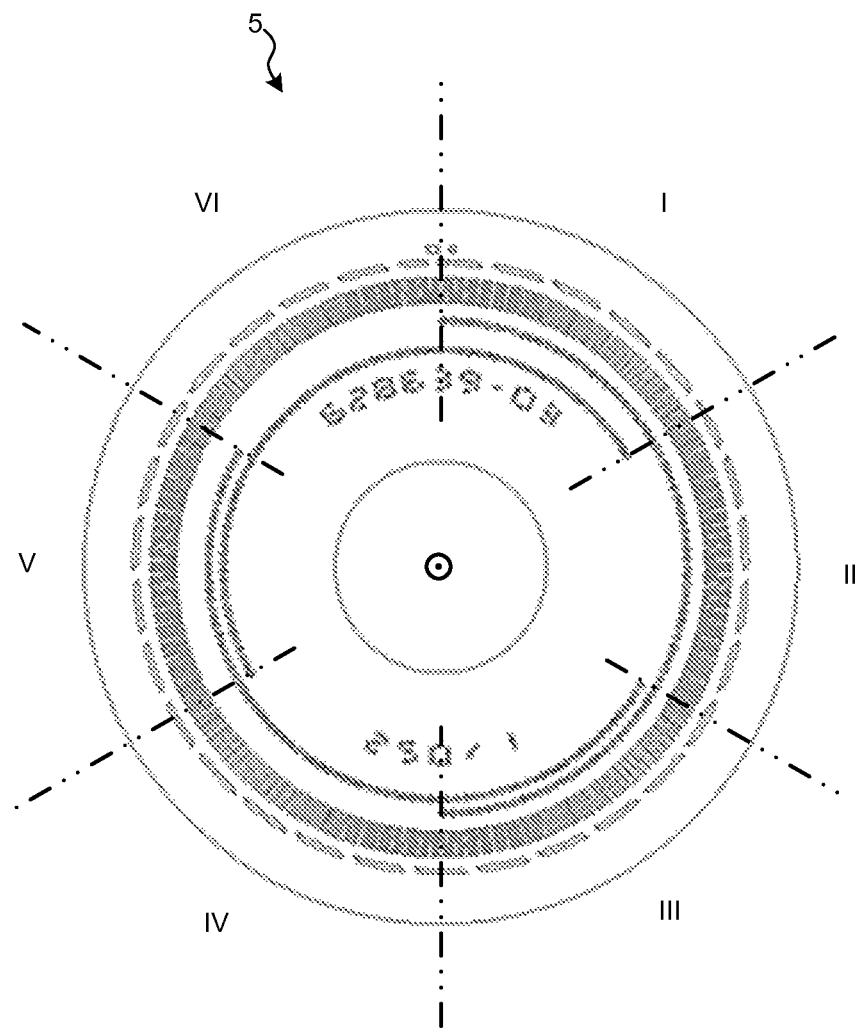

Referring to FIG. 2, the commutation track group 30 provides the code disk with six commutation segments, each corresponding to a 60-mechanical-degree portion of the disk with respect to the rotation axis 6. In this regard, segment I corresponds to 0 to 60 mechanical degrees, segment II corresponds to 60 to 120 mechanical degrees, segment III corresponds to 120 to 180 mechanical degrees, segment IV corresponds to 180 to 240 mechanical degrees, segment V corresponds to 240 to 300 mechanical degrees, and segment VI corresponds to 300 to 360 mechanical degrees. Thus, when the code disk 5 rotates in a given direction, the commutation track group 30 provides a distinct combination of signals that is unique to each segment passing over the three photodiode light detectors corresponding respectively to the three commutation tracks 31, 32, and 33 of the commutation track group 30. Referring to FIG. 2, if the photodiodes are initially at position between segments I and VI, the segments I to VI sequentially pass between the light sources and the photodiodes to sequentially control the coils 51, 52, and 53 of the brushless motor 50 as the code disk 5 (and the rotor of the brushless motor 50) rotate in the counter-clockwise direction. Since this commutation track group 30 relates to a two-pole (one pole-pair) motor, the mechanical degree values mentioned in regard to FIG. 2 are the same when expressed as magnetic degrees, as one full mechanical rotation of the rotor results in one full magnetic cycle of the rotor.

Figure 4:
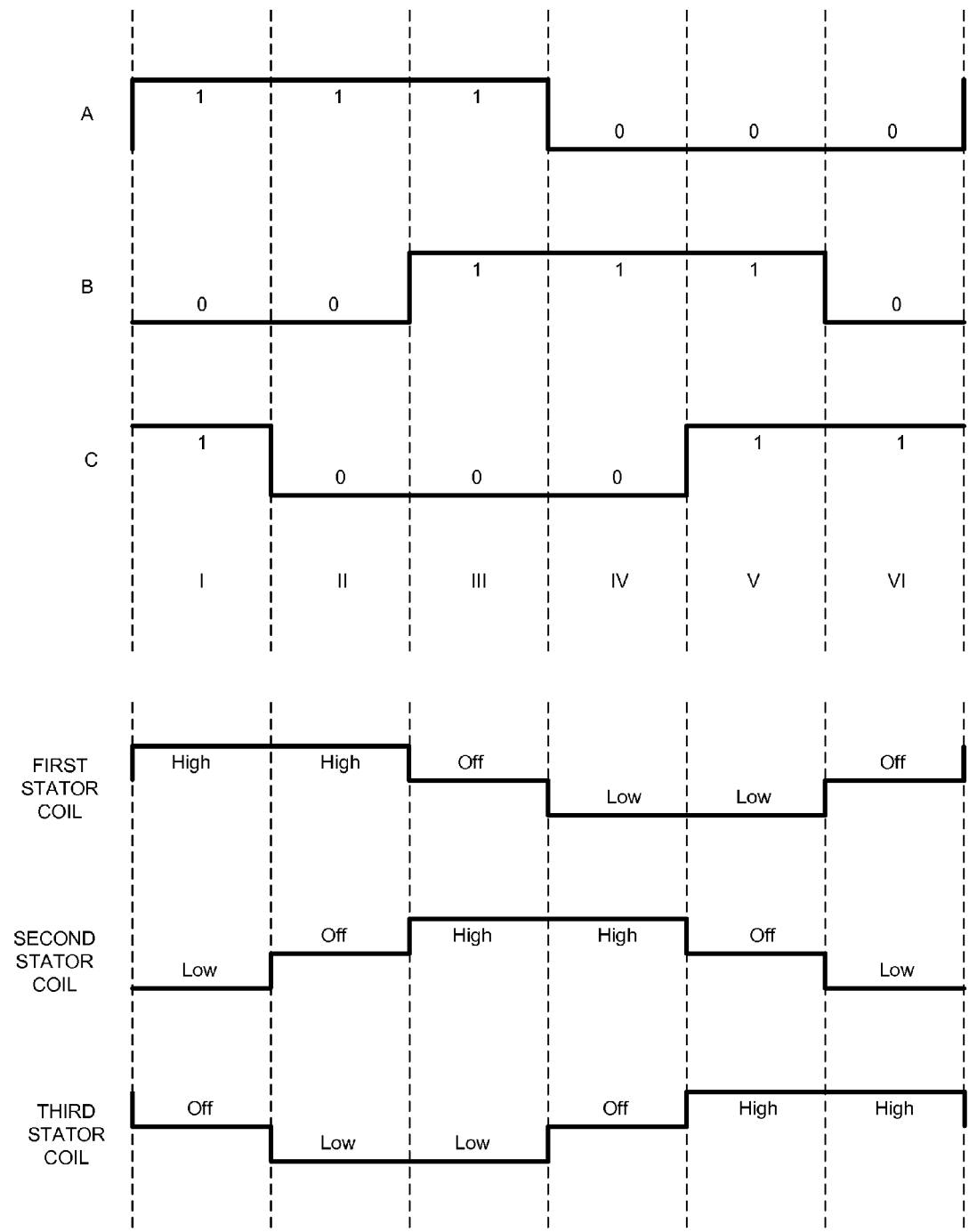
FIG. 4 is a graphical view of digitized output signals associated with the code disk of FIGS. 1 and 2.

The digitized sequential signals received by the three photodiodes or light sensors during the counter-clockwise rotation are illustrated in the top of FIG. 4. Based on the signal from the light sensors corresponding to the commutation tracks 31, 32, 33, the controller 45 controls the coils as indicated at the bottom of FIG. 4. Although three tracks are shown, it should be understood that any appropriate number of tracks may be provided.

Since the brushless motor 50 is a two-pole (or one pole-pair) motor, the commutation tracks 31, 32, and 33 extend approximately 180 mechanical degrees around the disk with respect to the rotation axis 6. Accordingly, a continuous slot would structurally compromise the code disk, which is a thin metal disk having a typical thickness of 25 to 40 microns. Accordingly, one pole-pair motors typically utilize Hall-effect sensors for commutation. The structural weakening associated with a continuous slot may be especially undesirable in higher speed applications, which may place higher structural loads on the disk.

In order to avoid the structural compromise associated with an elongated continuous slot, the commutation track group 30 is provided as a commutation track pattern. The commutation track pattern is a series of apertures or holes arranged such that, where the disk is intended to allow light to pass in the manner of a continuous slot, the adjacent holes are spaced closely enough together that the photodiode receives light continuously as the adjacent holes sequentially pass between the light source and the photodiode of the light sensor arrangement.

The holes are provided as circular apertures. However, it should be understood that any appropriate shape may be provided, e.g., rectangular, ovular, or any other shape including irregular shapes. Nonetheless, a circular, ovular or other curved shape may be desirable from a strength perspective and for avoiding stress concentrations associated with sharp corners, which smoothly curved apertures do not have.

The commutation pattern 30 of FIG. 1 includes a first series of apertures 36 extending from 0 to 180 mechanical degrees clockwise around the disk with respect to the rotation axis 6, a second series of apertures 37 extending from 120 mechanical degrees to 300 mechanical degrees clockwise around the disk with respect to the rotation axis 6, and a third series of apertures 38 extending from 240 to 420 mechanical degrees clockwise (i.e., 60 degrees clockwise beyond the zero-degree position) around the disk with respect to the rotation axis 6. The first, second, and third series of apertures 36, 37, and 38 are disposed at a radius of 10.542 mm, 10.135 mm, and 10.542 mm, respectively. Moreover, the pitch between adjacent apertures 36 of the first series is 1.4855 mechanical degrees, the pitch between adjacent apertures 37 of the second series is 1.5361 mechanical degrees, and the pitch between adjacent apertures 38 of the third series is 1.5192 mechanical degrees. The first series is a string of 122 circular apertures 36 having a diameter of 0.16 mm, the second series is a string of 118 circular apertures 37 having a diameter of 0.16 mm, and the third series is a string of 112 circular apertures 38 having a diameter of 0.16 mm. The spacing between apertures 36 (e.g., measured as an arc distance between near edges of the adjacent apertures based on the radial distance from the rotation axis of at which the apertures are located) is greater than the spacing between the apertures 37, which is greater than the spacing between the apertures 38. Since the light sensor arrangement of some example embodiments is pie-shaped, this spacing allows the same number of apertures 36, 37, 38 for each track to be disposed above the sensor arrangement.

It should be understood that although specific dimensions and orientations are provided with regard to the commutation pattern 30, any appropriate dimensions and/or orientations may be provided. For example, the apertures of different tracks and/or series may have different diameters or the apertures within one or more of the series may have differing diameters.

Figure 5:
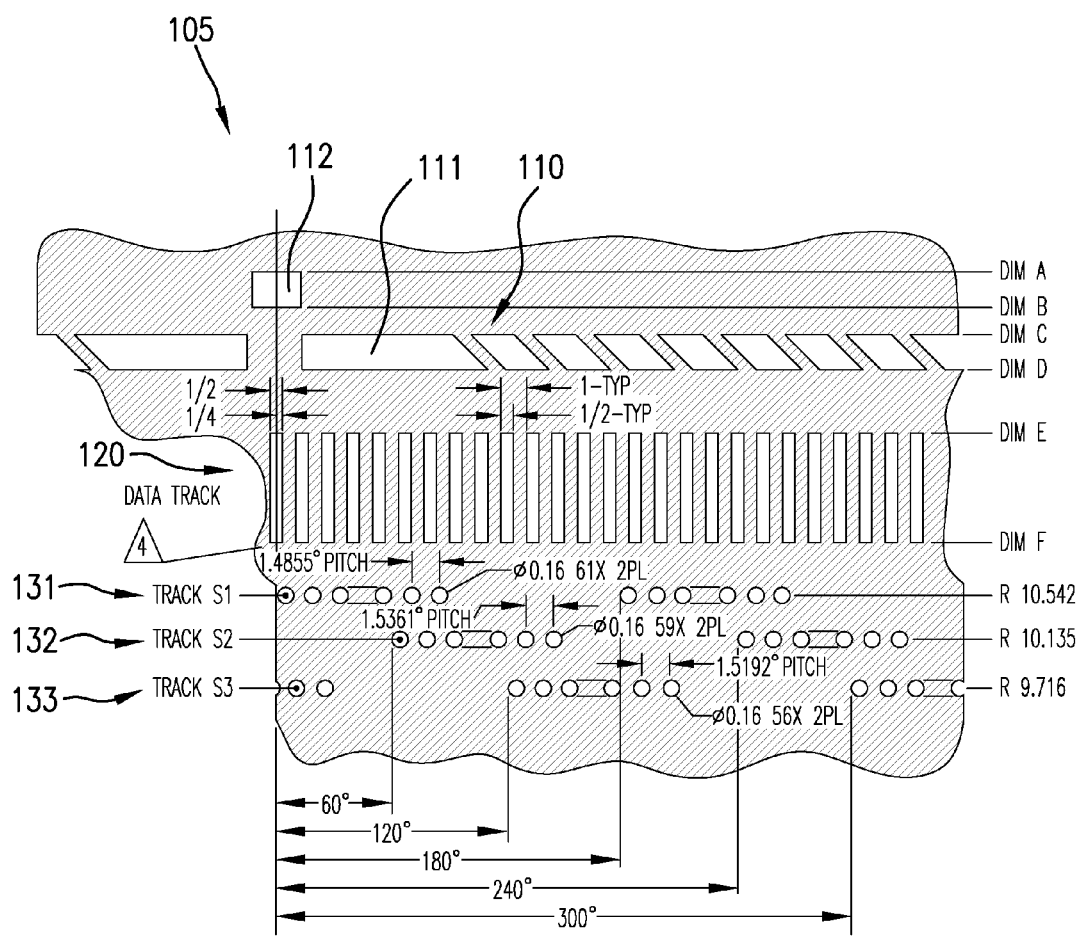
FIG. 5 is a partial view of a code disk configured for commutation of a 4-pole (2 pole-pair) motor according to example embodiments of the present invention.
Figure 6:
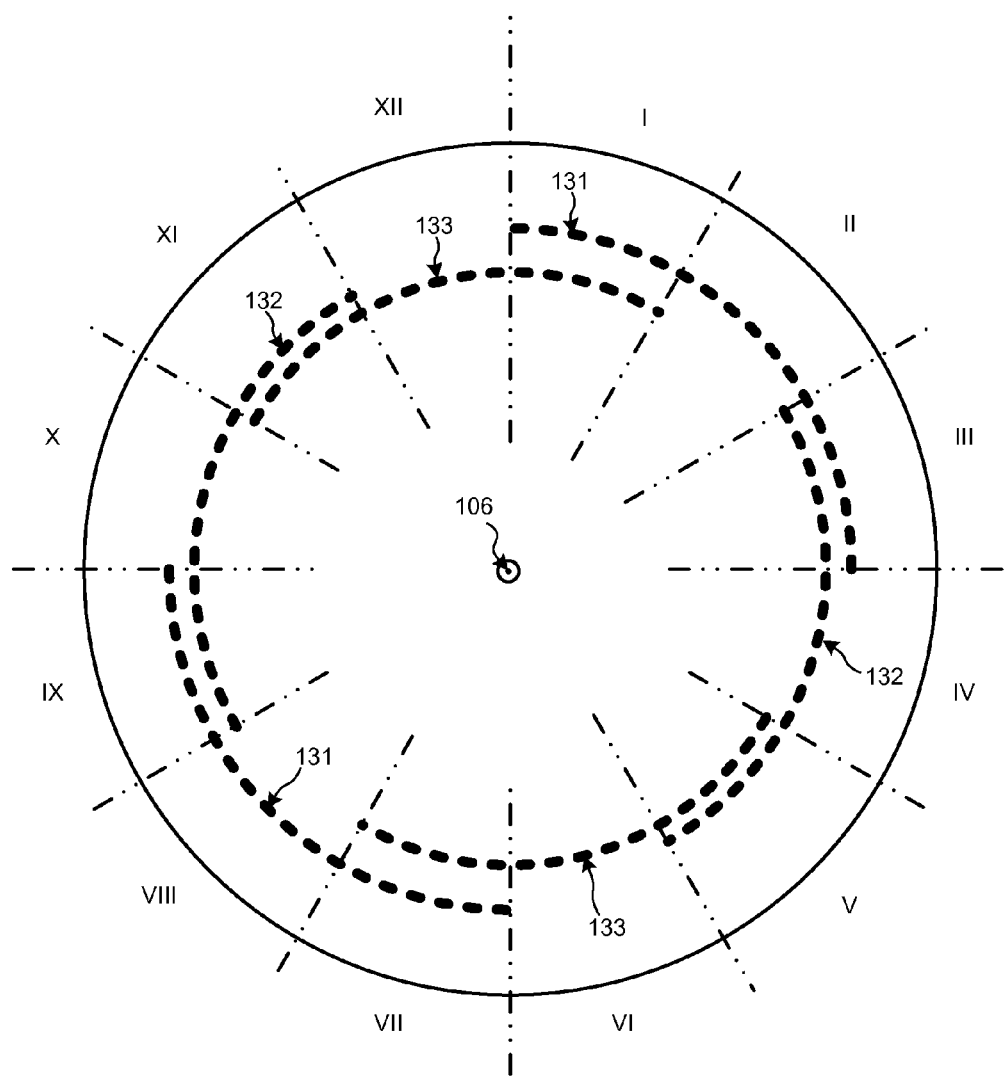
FIG. 6 is a schematic top view of the commutation pattern (for a 4-pole (2 pole-pair) motor) of the code disk of FIG. 5.

FIG. 5 is a partial top view of an encoder code disk 105 according to example embodiments of the present invention. The code disk 105 is very similar to code disk 5, but differs in that the code disk 105 includes two series of apertures for each track. Thus, the commutation track pattern 130 of disk 105 provides 6 distinct signal combinations which repeat once to provide 12 segments, labeled in FIG. 6 with Roman numerals I to XII, of 30 mechanical degrees each, for the commutation. This pattern is suitable for the commutation for driving a 4-pole (2 pole-pair) motor. It is noted that FIG. 6 is a schematic view of the commutation pattern of the code disk 105 and is not drawn to scale. Further, the number and shape of the apertures are for schematic illustration purposes only.

The first series of apertures of the outer track 131 spans from 0 to 90 mechanical degrees clockwise with respect to the rotational axis of the code disk, and the second series of apertures of the outer track 131 spans from 180 to 270 mechanical degrees clockwise with respect to the axis. The first series of apertures of the middle track 132 spans from 60 to 150 mechanical degrees clockwise with respect to the rotational axis and the second series of apertures of the middle track 132 spans from 240 to 330 mechanical degrees clockwise with respect to the rotational axis. The first series of apertures of the inner track 133 spans from 120 to 210 mechanical degrees clockwise with respect to the rotational axis and the second series of the inner track 133 spans from 300 to 390 mechanical degrees (i.e., 30 mechanical degrees clockwise beyond the zero-degree position) with respect to the rotational axis.

Since the code disk pattern of FIG. 5 relates to a 4-pole (2 pole-pair) motor, the number of mechanical degree values mentioned with regard to the example embodiment of FIG. 5 are one-half the value expressed as magnetic degrees, as one full mechanical rotation of the rotor results in two full magnetic cycles of the rotor. For example, the span of the first series of outer track 131 from 0 to 90 mechanical degrees described above corresponds to a span of 0 to 180 magnetic degrees, and the span of the second series of outer track 131 from 180 to 270 mechanical degrees described above corresponds to 360 to 540 magnetic degrees (i.e., from 0 to 180 degrees in the second magnetic cycle of the single mechanical rotation of the rotor).

For illustration purposes, FIG. 5 shows only the first and last three apertures in each series of the commutation tracks 131, 132, and 133. Similar to disk 5, disk 105 includes an index track arrangement 110 with an "off" track 111 and an "on" track 112, as well as a data track 120 for incremental positional determination.

Further, each of the two series of the outer track 131 includes 61 circular apertures, each of the two series of the middle track 132 includes 59 apertures, and each of the two series of the inner track 133 includes 56 apertures. The radii of the three tracks are the same as specified above with regard to disk 5, and the spacing and pitch of adjacent apertures of each series is the same as set forth above for adjacent apertures in each of the corresponding tracks 31, 32, and 33.

Figure 7:
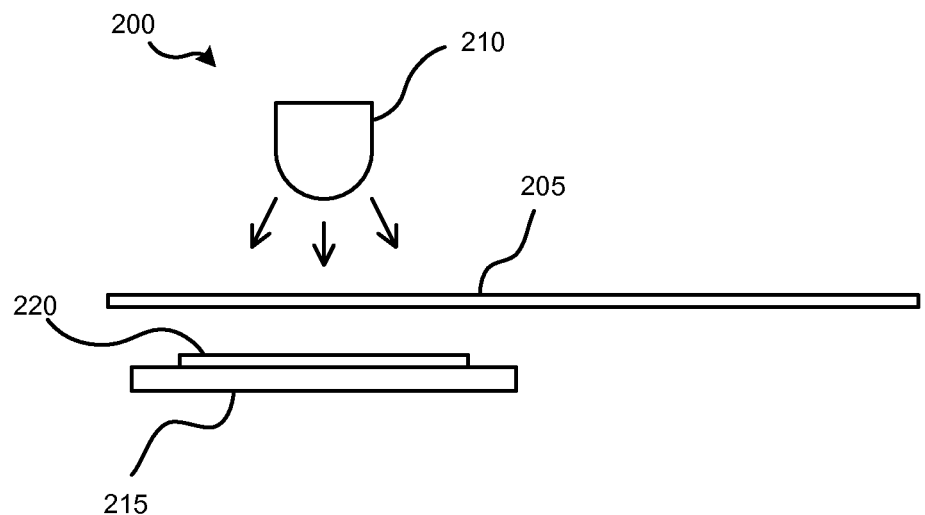
FIG. 7 is a schematic side view of a code disk with a light source and a light sensor according to example embodiments of the present invention.

FIG. 7 is a side view of a portion 200 of an encoder system, including a light source 210, a code disk 205, a substrate 215, and a photodiode detector array or other light sensor arrangement 220 disposed on the substrate 215. As the code disk 205 is displaced with respect to the sensor arrangement 220 and the light source 210, the code disk 205 directs light from the light source 210 to the sensor arrangement 220 though apertures through the code disk 205. The code disk may be, e.g., either of the code disks 5 and 105 described above, with the light passing through the apertures of the commutation pattern to allow commutation of a brushless motor.

Figure 8:
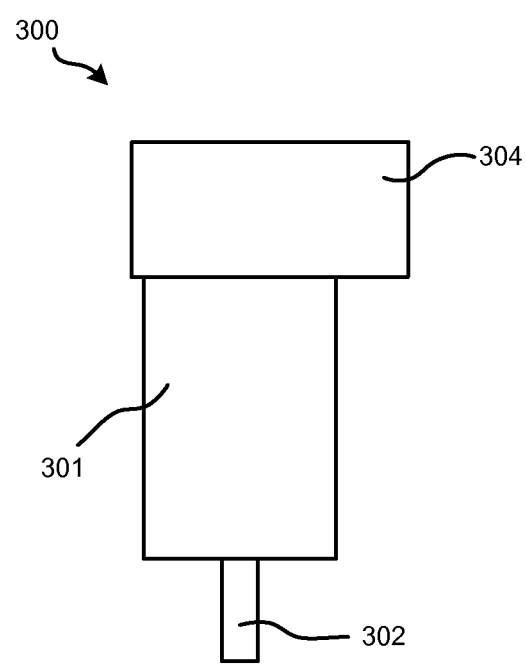
FIG. 8 is a side view of a brushless drive system according to example embodiments of the present invention.

FIG. 8 is a side view of a brushless drive system 300 including a brushless motor 301 having an output shaft 302. The system 300 also includes an optical encoder 304 including a code disk as described herein, e.g., a code disk having the features of code disk 5 or 105. The commutation pattern of the code disk of the encoder 304 provides a signal for the commutation of the brushless motor 301 to allow the coils of the electromagnets of the stator to be controlled to produce the desired rotation of the stator, which drives the output shaft 302. The brushless motor is a one pole-pair motor and may provide the same configuration as the motor 50 illustrated in FIG. 3. It should be understood, however, that other types of motors may be provided, including motors with more than one pole-pair.

It should be understood that the patterned design of the code disks described herein may be used in other regions of a code disk where an elongated light path is desired. For example, a series of apertures of circular or other shape may be provided radially in place of a radial slot, or circumferentially in place of one or both of the index tracks. Further, it should be understood that the apertures may be provided with non-uniform spacing, size and shape, even within the same series of apertures. Moreover, although the encoder is a full differential incremental encoder, the aperture pattern may be adapted to any suitable type of encoder, e.g., a single-ended incremental encoder or an absolute encoder.

Although the present invention has been described with reference to particular examples and embodiments, it should be understood that the present invention is not limited to those examples and embodiments. Moreover, the features of the particular examples and embodiments may be used in any combination. The present invention therefore includes variations from the various examples and embodiments described herein, as will be apparent to one of skill in the art.

What is claimed is:

1. An optical encoder, comprising:
a light source;
a light sensor array; and
a code disk including:
  a data track having a plurality of slots configured to allow light from the light source to pass to the light sensor array to determine a rotational position and direction of the code disk; and
  a commutation pattern having:
    a first commutation track including a series of apertures which are spaced closely enough together to allow light to continuously pass from the light source to a first light sensor of the light sensor array such that the first light sensor continuously receives light as the series of apertures passes over the first light sensor;
    a second commutation track including a series of apertures which are spaced closely enough together to allow light to continuously pass from the light source to a second light sensor of the light sensor array such that the second light sensor continuously receives light as the series of apertures passes over the second light sensor; and
    a third commutation track including a series of apertures which are spaced closely enough together to allow light to continuously pass from the light source to a third light sensor of the light sensor array such that the third light sensor continuously receives light as the series of apertures passes over the third light sensor;

wherein the relative positions of the first, second, and third commutation tracks correspond to a continuous commutation sequence of a first coil, a second coil, and a third coil of a brushless motor.

2. The optical encoder of claim 1, wherein the first commutation track is disposed at a first radial distance from a rotation axis of the code disk, the second track is disposed at a second radial distance from the rotation axis, the second radial distance being less than the first radial distance, and the third commutation track is disposed at a third radial distance from the rotation axis, the third radial distance being less than the second radial distance.

3. The optical encoder of claim 1, wherein the apertures of the first, second, and third tracks are circular.

4. The optical encoder of claim 3, wherein the diameter of the apertures of the first, second, and third tracks is between 0.1 and 0.2 mm.

5. The optical encoder of claim 3, wherein the diameter of the apertures of the first, second, and third tracks is 0.16 mm.

6. The optical encoder of claim 1, wherein:
adjacent apertures of the series of the first track are spaced apart from each other by a first distance;
adjacent apertures of the series of the second track are spaced apart from each other by a second distance, the second distance being less than the first distance; and
adjacent apertures of the series of the third track are spaced apart from each other by a third distance, the third distance being less than the second distance.

7. The optical encoder of claim 1, wherein the data track is disposed at a fourth radial distance from the rotation axis, the fourth radial distance being greater than the first radial distance.

8. The optical encoder of claim 1, wherein the commutation sequence corresponds to a one pole-pair brushless motor.

9. The optical encoder of claim 8, wherein the brushless motor has a stator having exactly three electromagnets.

10. The optical encoder of claim 1, wherein the thickness of the code disk is between 25 microns and 40 microns.

11. The optical encoder of claim 1, wherein:
the series of apertures of the first commutation track extends 180 mechanical degrees around the rotation axis;
the series of apertures of the second commutation track extends 180 mechanical degrees around the rotation axis; and
the series of apertures of the third commutation track extends 180 mechanical degrees around the rotation axis.

12. The optical encoder of claim 11, wherein, moving clockwise around the rotation axis of the code disk, the first aperture in the series of the second commutation track is disposed 120 mechanical degrees from the first aperture of the series of the first commutation track, and the first aperture in the series of the third commutation track is disposed 120 mechanical degrees from the first aperture in the series of the second commutation track.

13. The optical encoder of claim 1, wherein the first commutation track, the second commutation track, and the third commutation track each include two series of apertures, the two series being separated by disk portions that prevent light from passing from the light source to the respective light sensor.

14. The optical encoder of claim 13, wherein each series of apertures of the first commutation track, the second commu-tation track, and the third commutation track extends 90 mechanical degrees around the rotation axis.

15. The optical encoder of claim 1, wherein the optical encoder is an incremental encoder.

16. The optical encoder of claim 15, wherein the optical encoder is an absolute encoder.

17. A motor system, comprising:
a brushless motor; and
an optical encoder including:
a light source;
a light sensor array; and
a code disk including:
a data track having a plurality of slots configured to allow light from the light source to pass to the light sensor array to determine a rotational position and direction of the code disk; and
a commutation pattern having:
a first commutation track including a series of apertures which are spaced closely enough together to allow light to continuously pass from the light source to a first light sensor of the light sensor array such that the first light sensor continuously receives light as the series of apertures passes over the first light sensor;
a second commutation track including a series of apertures which are spaced closely enough together to allow light to continuously pass from the light source to a second light sensor of the light sensor array such that the second light sensor continuously receives light as the series of apertures passes over the second light sensor; and
a third commutation track including a series of apertures which are spaced closely enough together to allow light to continuously pass from the light source to a third light sensor of the light sensor array such that the third light sensor continuously receives light as the series of apertures passes over the third light sensor;
wherein the relative positions of the first, second, and third commutation tracks correspond to a continuous commutation sequence of a first coil, a second coil, and a third coil of the brushless motor.

18. The motor system of claim 17, further comprising a controller configured to supply current to electromagnetic coils in the motor stator based on the signals received from the first, second, and third light sensors.

19. The motor system of claim 17, wherein the brushless motor is a one pole-pair brushless motor.

20. A code disk for an optical encoder, comprising:
a data track having a plurality of slots configured to allow light from a light source to pass to a light sensor array to determine a rotational position and direction of the code disk; and
a commutation pattern having:
a first commutation track including a series of apertures which are spaced closely enough together to allow light to continuously pass from the light source to a first light sensor of the light sensor array such that the first light sensor continuously receives light as the series of apertures pass over the first light sensor;
a second commutation track including a series of apertures which are spaced closely enough together to allow light to continuously pass from the light source to a second light sensor of the light sensor array such that the second light sensor continuously receives light as the series of apertures passes over the second light sensor; and a third commutation track including a series of apertures which are spaced closely enough together to allow light to continuously pass from the light source to a third light sensor of the light sensor array such that the third light sensor continuously receives light as the series of apertures passes over the third light sensor;

wherein the relative positions of the first, second, and third commutation tracks correspond to a continuous commutation sequence of a first coil, a second coil, and a third coil of a brushless motor.

\* \* \* \* \*